United States Patent Office 2,898,131
Patented Aug. 4, 1959

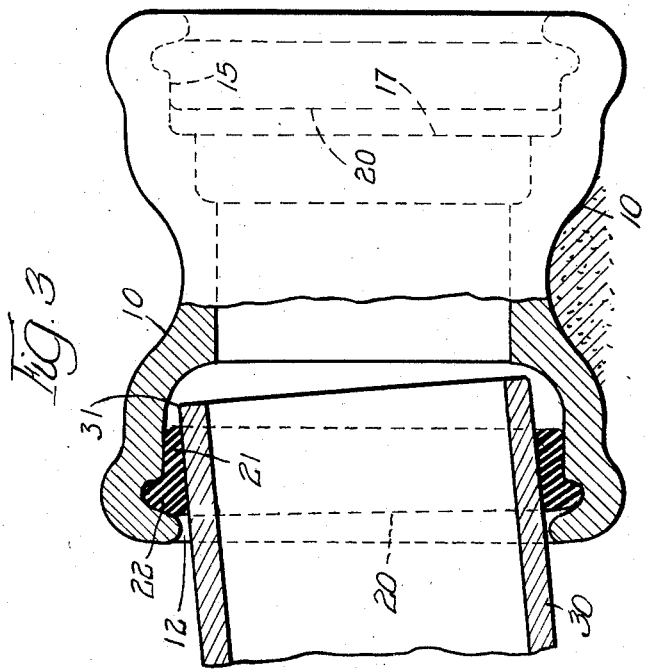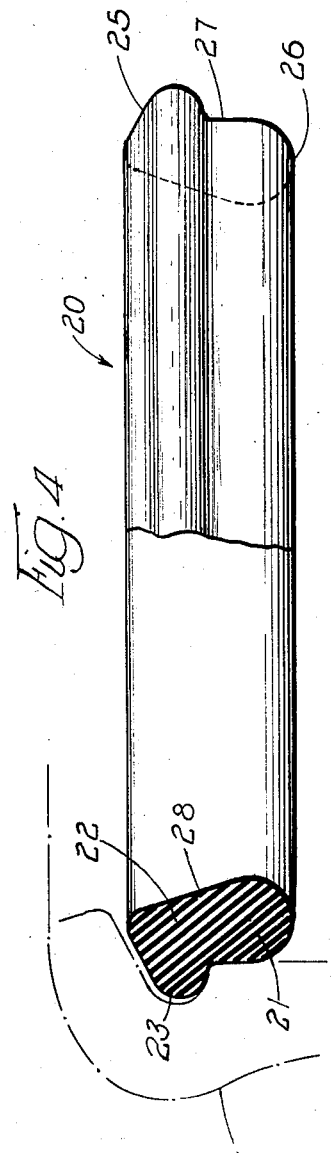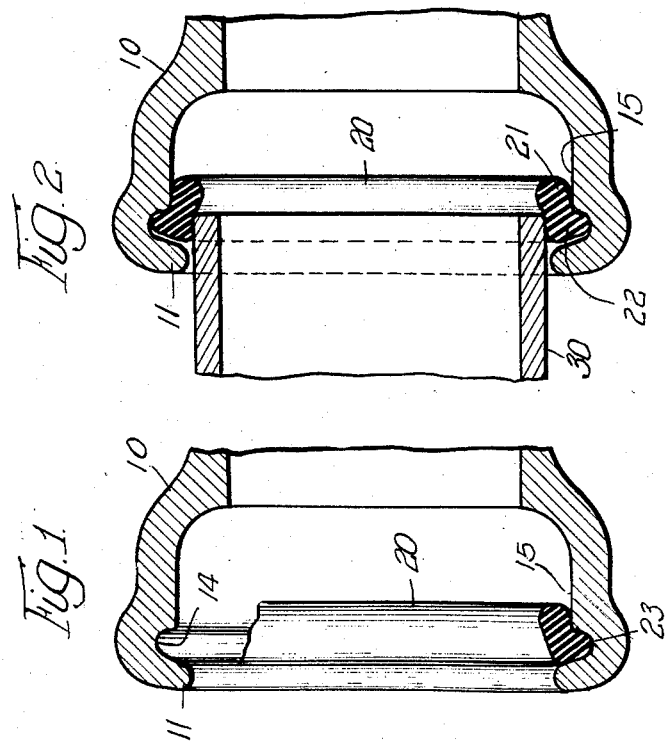

2,898,131

FLEXIBLE PIPE-JOINT

Ralph W. Kurtz, Coshocton, Ohio, assignor to James B. Clow & Sons, Inc., Chicago, Ill., a corporation of Delaware Application February 4, 1958, Serial No. 713,159

4 Claims. (Cl. 285—231)

This invention relates to the joining of pipes that vary somewhat in diameter and alignment; to pipes, for instance, that are cast from iron and installed in a trench.

Pipes of this sort are usually joined by placing the plain end or "spigot" of one in a sleeve or "bell" mounted on another and stuffing the radial gap therebetween with a material such as rubber. Various devices are employed to prevent the rubber from being loosened; devices which range from costly glands to simple, but relatively ineffectual, convolutions in the bell surface.

Alternatively, gaskets have been mounted in a bell and tightned by simply pushing a beveled pipe therethrough. In this case, the gasket is stressed in divers ways that may be cumulative in their effect and ruinous. If the gasket is engaged by a sharp, dry, or somewhat over-sized pipe, and crammed against a ledge in the bell, the prospect of damage is appreciable.

To avoid this cramming action, gaskets have been anchored by a ridge projecting radially therein from the bell. The axially inner, the sealing portion, of the gasket is then drawn out and eased, rather than squeezed, over the end of the pipe. The power needed to force the pipe "home" is accordingly low; the tackle needed, conveniently light.

That the sealing portion of the gasket may be supported even better, without the aid of a ridge in the bell does not seem to have been well investigated. This has now been done and the study has revealed certain advantages from constructing a joint, especially a large joint, as described herein.

In the accompanying drawing:

Figure 1 is a side view in section of a pipe coupling which embodies the new construction.

Figure 2 shows a pipe being inserted in the coupling of Figure 1.

Figure 3 shows a pipe fully inserted, and cocked, in the coupling of Figure 1.

Figure 4 is a relatively large, partly sectional, view of the packing ring, or gasket.

As shown in Figures 1 and 3, the coupling comprises a pair of axially opposed bells 10, 10 and gaskets 20, 20 mounted therein. The mouth of each bell is provided with an open-end wall or lip 11, which cooperates with a pipe 30 in defining a narrow annular gap 12 therebetween. The inner side of the lip adjoins an annular groove 14 and slants axially outwardly, from the centerplane of the groove, at an angle preferably greater than 25 degrees.

Extending axially inwardly from the groove and defining an annular shoulder therewith is an inverse cylindrical surface 15 which has radially abutting relationship with the sealing portion 21 of the gasket 20. Axially, the gasket is secured in the bell by a backing portion 22, which abuts the lip 11; and a shoulder or ridge 23, which extends into the groove 14. Excluding the ridge, the gasket has a wedge-like body 21, 22.

As best shown in Figure 4, the ridge 23 is about one third as broad as the entire gasket. The axially outer face 25 of the gasket is slanted to fit the lip 11; the axially inner face 26, simply rounded. The radially outer face 27 is cylindrical, for engaging the surface 15; and the radially inner face 28 is flared outwardly, for admitting the pipe. An angle of about 20 degrees is included by the faces 27, 28.

The pipe 30 is inserted in the lip 11 of the bell and forced home, i.e. into the position shown in Figure 3, by means of tackle not depicted but well known in this field of work. In the course of this action, the convergent inner face 28 of the gasket 20 is engaged by the outer edge 31 of the pipe. The ridge 23 is driven tightly against the axially inward side of the groove 14. The slanted face 25 of the gasket is somewhat straightened; the small anchoring ridge 23, braced against the pipe. The sealing portion 21 is then distended axially and compressed radially, between the pipe and the cylindrical surface 15 of the bell, an amount that increases axially inwardly.

The thrust on the gasket is reduced by soaping or otherwise lubricating the end of the pipe and dulling its leading edge 31. To assure a good tight joint, the sealing portion 21 of the gasket should be reduced in thickness no less than 5 percent or more than 40 percent by the cooperative action of the pipe and the bell. This means that the initial thickness of the sealing portion 21 should not be less than about three (100/35) times as great as the possible variation in the radial width of the annular channel intermediate the pipe and the cylindrical surface 15 of the bell.

In the case of a large cast iron pipe, the distance between the lip of the bell and the periphery of the pipe may be nil on one side and 0.30 inch diametrically oppositely. It follows then, that the sealing portion 21 of a gasket for such a pipe should be at least 0.90 inch thick. In order to be readily compressed, the hardness of the rubber should not exceed 65 Durometer (A).

When the pipe is forced through the gasket, the sealing portion 21 is turned partly inside-out. The cylindrical face 27 is lengthened at the expense of the rounded face 26. Contrawise, when subjected to hydraulic pressure, the sealing portion tends to become thicker and tighter. The hydraulic force is not relied upon to seal the joint, however. Water can be drained from a pipe line, joined as here set forth, without danger of any surrounding liquids being drawn therein.

Being lubricated and flexibly packed, the joint must be constrained from separating in service. This is done by blocking the ends, and bends, of pipe lines comprising this construction. When so constrained, the joint will withstand pressures greater than those generally used for water distribution. Resistance to extrusion can be increased, if need be, by reinforcing the backing portion 22 of the gasket with, say 90 Durometer rubber.

The larger the bell and the greater the dimensional deviations, the more apt is the gasket to fit poorly and be snagged by the pipe. Being stiffened by a shoulder, not weakened by a neck, the gasket 20 is well constituted to resist sagging or buckling. While not so essential for small pipe, a shouldered or ribbed gasket is not a handicap down to the point that it cannot be folded into the bell.

Being anchored at its outer end only, and proportioned as indicated about twice as broad as thick, the gasket 20 is pressed toward and away from the lip 11 of the bell when the joint is flexed. The stress is relieved by this reaction and the possibility of the sealing portion 21 being deformed, plastically and permanently, is reduced. Flexure can, but need not, be limited by a ledge such as 17 (dashed outline, Figure 3).

Being cylindrical, the sealing surface 15 of the bell can be readily cast without seams. Split rings are needed to produce only that part of the bell core which forms the inner faces of the lip 11. The periphery of the core is favorably shaped for coating. The surfaces defining the critical mouth of the bell are easily cleaned and inspected.

The economy to be had, from the aforedescribed construction, is amplified by the fact that thousands of pipes are cast and installed daily. The action of an inlaid gasket cannot be observed as the pipe is pushed home and if the connection is later found to leak, the remedies are not simple. The faulty joint must be disengaged and overhauled, or sealed externally with the aid of an expensive sleeve. Any variation in design that increases the likelihood of a tight point being realized is thus very significant.

This application is a continuation-in-part of one filed February 25, 1957, and assigned Serial No. 642,313.

I claim:

1. A flexible joint for cast iron pipes and similar articles which vary within wide dimensional tolerances comprising a bell, a resilient rubber-like annular gasket mounted in said bell, and a pipe spigot inserted in said gasket; said bell having integrally formed therewith a substantially constant-diameter cylindrical bearing surface which supports said gasket radially and extends axially inwardly therebeyond, an annular groove which adjoins and forms the outer boundary of said cylindrical bearing surface said groove having a bottom face that curves smoothly into the sides thereof, an outer end-wall having an inner surface which slants axially outwardly and radially inwardly from said groove, and an opening in said outer end-wall with a diameter that is substantially less than the diameter of said cylindrical bearing surface and somewhat greater than the outside diameter of said pipe spigot; said gasket having a cylindrical sealing face that abuts said cylindrical bearing surface of the bell, a ridge at the axially outer end thereof substantially complementary to said groove, a conical end-face that normally fits loosely against said inner surface of the outer end-wall of the bell, an internal sealing face that joins said conical end-face and normally converges axially and radially inwardly for a distance substantially beyond said ridge to lie axially intermediate the ends of said cylindrical bearing surface, said internal sealing face having at the axially outer end thereof a diameter slightly larger than said opening in the outer end-wall of the bell whereby the pipe spigot can be freely accommodated, and a rounded end-face that joins the axially inner ends of said cylindrical sealing face and said internal sealing face in a plane substantially normal to the cylindrical sealing face; the axial length of said cylindrical sealing face being less than the cross-sectional thickness of the gasket measured before coupling at said substantially normal plane, and said cross-sectional thickness being reduced in the range from 5 percent to 40 percent by the coupling action regardless of the lateral position of the pipe spigot in said opening in the end-wall of the bell.

2. The flexible joint described in claim 1 further characterized by said cylindrical sealing face and said internal sealing face normally including an angle of approximately twenty degrees.

3. The flexible joint described in claim 1 further characterized by the sealing portion of said gasket having a hardness as great as 65 Durometer (A).

4. The flexible joint described in claim 1 further characterized by said bell having an internal ledge axially spaced from said gasket for limiting the deflection of the pipe spigot therein.

References Cited in the file of this patent

UNITED STATES PATENTS

| 1,924,020 | Bihet | Aug. 22, 1933 |
| 2,116,705 | Marx | May 10, 1938 |
| 2,174,105 | Haury | Sept. 26, 1939 |
| 2,245,154 | McWane | June 10, 1941 |
| 2,272,811 | Nathan | Feb. 10, 1942 |
| 2,505,863 | Keech | May 2, 1950 |

FOREIGN PATENTS

| 806,525 | France | Sept. 28, 1936 |